July 16, 1968  D. K. SWICK ET AL  3,392,435

PROCESS FOR WELDING CAST IRON STRUCTURES

Filed April 14, 1965

INVENTOR.
DWAIN K. SWICK
CLARENCE. E. SWICK
BY

ATTORNEYS

United States Patent Office 3,392,435
Patented July 16, 1968

3,392,435
PROCESS FOR WELDING CAST
IRON STRUCTURES
Dwain K. Swick and Clarence E. Swick, both of
400 N. Chestnut, McPherson, Kans. 67460
Filed Apr. 14, 1965, Ser. No. 448,034
6 Claims. (Cl. 29—402)

ABSTRACT OF THE DISCLOSURE

This invention relates to welding of cast iron, particularly to a new process of building up and/or repairing of cracks in cast iron structures by welding. More particularly, this invention relates to a process of welding cast iron structures involving the preheating of the structure to a predetermined temperature; locating the defective areas in the structure and removing material in the subject areas to be welded; welding the defective area by depositing molten cast iron weld material therein; rapidly cooling the area to a predetermined temperature; and then slowly cooling the welded structure to a low temperature at a predetermined cooling rate in order to achieve a repaired structure without warpage and unbalanced stresses therein.

---

The welding of cast iron structures, particularly relatively large complex cast iron structures such as engines, engine blocks, cylinder heads, etc., presents many problems. The employment of presently known welding techniques for such repair has not been satisfactory. Very frequently engine blocks, cylinder heads, etc. are merely discarded and replaced with new structures when a crack occurs. Invariably, the equipment, of which the cracked structure is a part, is thereby rendered out of operation for a relatively long period of time while a new part is ordered or fabricated. This down time is particularly serious in a factory, machine shop, plant, etc. where often a large number of employees are unable to work until the repair is satisfactorily completed. Under these circumstances repair of the cracked cast iron structure by welding is desirable, provided that it can be satisfactorily accomplished, since it will normally reduce the down time of the equipment.

Metals in general have a relatively high thermal coefficient of expansion. When a metal structure is unevenly heated, the hotter areas expand more than do the relatively cooler areas, consequently setting up internal stresses within the structure. When a cast iron structure is welded by conventional methods, the area of the weld is normally much hotter than the surrounding areas. After the portions of the structure are fused by the weld, they are relatively immovable. When the cast iron structure then cools to a uniform temperature, various portions which were heated to varying temperatures contract in varying amounts. Internal stresses are thereby set up which are very serious in cast iron structures, since the metal is relatively brittle. Very often the structure will break upon cooling, or will be so weakened by the internal stresses that it will be unserviceable. In addition, cast iron will grow or expand upon heating due to crystal growth. This factor further complicates the situation with respect to internal stresses produced by welding since ordinarily the growth is related to the heat applied and is not therefore uniform throughout the structure.

In some processes known to the prior art for the repair of cast iron structures, an effort is made to avoid heating the area of the repair to high temperatures. One such process is known as "studding." In this repair process holes are tapped and drilled in the casting on each side of the fracture and studs screwed into the holes. A mild steel weld is then deposited on the surface of the structure overlying the fracture and in engagement with the studs. This structure in general corresponds to a butt strap joint in a riveted splice. The basis of the design for such a repair is similar to the basis of a design for a riveted splice. However since the weld metal often breaks away from the casting during cooling, these joints are seldom reliable for tightness against fluids or gases.

Another analogous type of repair of cast iron structures known to the prior art involves drilling, or otherwise forming an elongated recess transverse to the fracture on either side of the fracture in the casting, and then snugly fitting an insert therein to bridge the fracture. In order to seal the crack itself, a strip of ductile metal is then driven into the crack and peened. This method of repair is generally unsatisfactory if the structure is exposed to high temperatures or pressures since the ductile metal seal will frequently fail. This type of repair is in general unsatisfactory for the repair of engines, engine blocks, cylinder heads, etc.

When a cast iron structure that has been welded is intended for severe service it is a general practice to thermally relieve the stresses caused by the welding. The normal practice in stress relieving welded cast iron structures is to apply the post heat immediately upon completion of the weld, raising the temperature at a rate which permits uniform heat absorption over the entire mass of the structure to 1100 to 1150 degrees F. and holding the weldment at that temperature for not less than one hour per inch of thickness. The structure is then cooled in a stress relief furnace. This method of welding and subsequently stress relieving cast iron structures, particularly complex structures, has not been entirely satisfactory. In general, the post heat does not completely relieve internal stresses and leaves the casting in a weakened condition. Further, a great deal of troublesome warping of the structure is encountered. This warping is very serious in the case of engine blocks and the like, since bearing mounts become misaligned, abutting surfaces, such as a surface on an engine block that abuts the cylinder head, become twisted, etc. This warping renders the structure inserviceable, since warping distortion cannot be satisfactorily corrected.

In general there is no general satisfactory method known to the prior art for the repair of cast iron structures, particularly complex cast iron structures such as blocks, cylinder heads, cases, etc.

We have invented a new method for welding cast iron structures. In the new method of our invention the cast iron structure is first pre-heated to a temperature in the range of 1100 to 1600 degrees F. The weld is then made on the structure, and the resultant welded area cooled to a temperature below the temperature of the remaining portion of the structure. The structure is subsequently slowly cooled to a safe handling temperature preferably in a controlled environment.

The new method of welding cast iron structures of our invention solves all of the problems common to known welding repair techniques. When using the welding method of our invention, the resultant repaired cast iron structure is relatively free of internal stresses. Since there is an absence of internal stresses, the resultant structure is very strong and serviceable. The method of our invention of welding also help to overcome warping of the cast iron structures. This materially avoids a quite prevalent serious problem where warpage causes the resultant repaired product to be completely unserviceable.

An object of this invention is to provide a new method for repairing cast iron structures.

Another object of this invention is to provide a new method of welding cast iron structures.

Yet another object of this invention is to provide a new method of welding cast iron which completely relieves the internal stresses in the structure being welded.

Another object of this invetnion is to provide a new method of welding relatively complex cast iron structures, such as engine blocks, cylinder heads, etc.

Yet another object of this invention is to provide a new method of welding cast iron structures that can be accomplished with a minimum of equipment in the field.

Another object of this invention is to provide a new method of welding cast iron structures in which the tendency to warp the structure is minimized.

Another object of this invention is to provide a new method for building up portions of cast iron structures which leaves the structures in strong serviceable condition.

Other objects and advantages of the new process of our invention will become apparent to those skilled in the art upon reading the disclosure.

Drawings and examples accompany and are a part of this disclosure. These drawings and examples depict and describe preferred specific embodiments of the new process of our invention, and it is understood that such drawings are not to unduly limit the scope of our invention. In the drawings, FIG. 1 is a top view illustrating a typical fractured casting positioned on a table preparatory to being welded in accordance with the process of welding cast iron structures of our invention.

Figure 2:
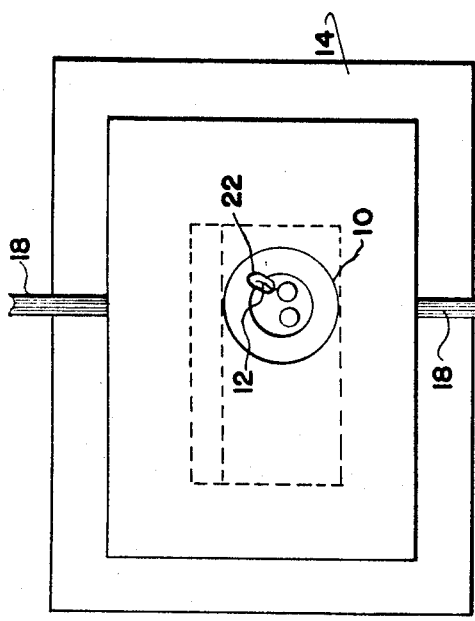
FIG. 2 is a top view of the fractured cast iron block partially enclosed in a furnace with portions of the casting melted our about the fracture in accordance with the process of our invention.

The following is a discussion and description of the new welding process of our invention made with reference to the drawings, wherein the same reference numerals are used to indicate the same or similar parts and/or structure. The discussion and description is of preferred specific embodiments of the new welding process of our invention, and it is to be understood that such is not to unduly limit the scope our invention.

Figure 1:
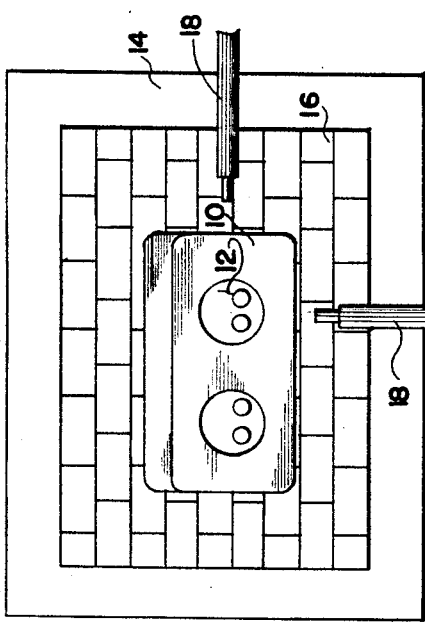
Figure 3:
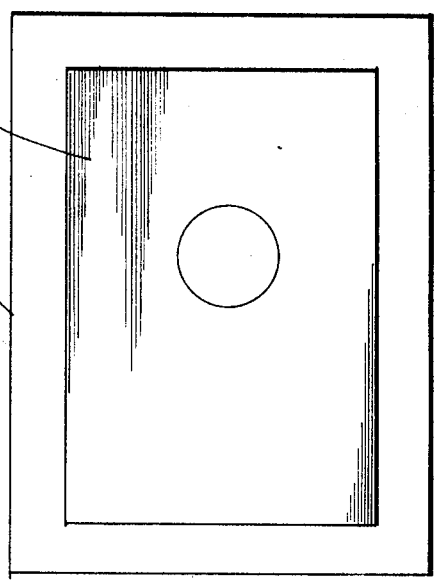
FIG. 3 is a top view illustrating the slow cooling of the welded structure in the closed furnace as would occur during the cooling stage of the process of our invention.

Referring now to the drawings, FIGS. 1 through 4, there is illustrated in FIGS. 1 through 3 the general sequence of method steps of the process for repairing cracked cast iron structures of our invention. As illustrated in FIG. 1, the cast iron structure 10 has a fracture 12 to be repaired. For purposes of illustration, the cylinder head of a large tractor is depicted in the figures of the drawings. The head 10 is positioned on a table 14 having preferably a layer 16 of firebricks thereon. Considerable care should be taken to make certain that the head 10 is firmly and evenly supported on the table 14. Supports such as angle irons 11 and 13, or other suitable means, are preferably placed on floor 16 and the casting is rested thereon. Failure to take the proper precautions for evenly supporting the structure may result in warping. Another consideration in positioning the head 10 on the table 14 is to have the surface to be welded positioned as level as possible. The reason for this very desirable level position of the welded area will become apparent in the discussion that follows.

An enclosure of furnace 20 is built up about the head 10. The enclosure 20 can be of any suitable material and type. The furnace can conveniently be constructed of firebrick laid up to form a peripheral wall. The furnace is spaced from the head 10 and provision made for allowing an access opening to the area of the fracture. The head is then pre-heated with suitable heating means. We have found that torches 18 work quite well. The block or other cast iron structure being repaired is heated to a temperature in the range of 1100 to 1600 degrees F., more preferably in the range of 1150 to 1500 degrees F., still more preferably in the range of 1200 to 1300 degrees F.

In general the head is heated to a cherry red heat indicating a temperature in excess of 1200 degrees F. In preheating the head 10, care should be taken to bring the heat up evenly. Heavier sections of the structure should be heated first in order to make the pre-heating as evenly as possible.

After the cast iron head 10 has been pre-heated to the desired temperature, the heating torches can be adjusted to maintain the pre-heat temperature during the subsequent process steps. As shown in FIG. 2 the enclosure 20 is constructed with the heating torches 18 extending through the firebrick walls thereof. Also provided in the enclosure 20 is an access opening to allow working on the fracture 12.

If the crack or fracture in the structure 10 is very small, it may be difficult to locate. A convenient method of locating the fracture is to play a torch about in the suspected area of the fracture while carefully noting the color changes in the area. In practice the crack or fracture forms an insulation barrier preventing passage of the heat from one portion of the casting to another. If heat is applied to one side of the fracture, the opposing side will be darker in color since the heat from the torch is not conducted efficiently across the fracture.

After the fracture has been definitely located and its length determined, it is enlarged to a groove, preferably on the order of one-half inch in width. The enlarging is preferably accomplished by melting out the material of the block with a welding torch without the use of excess oxygen. Using excess oxygen will result in the build-up of an oxide in the area of the groove which has a higher melting point than the base metal. Subsequent work will then require a higher temperature to melt this oxide formation. The width of the subsequent groove formed about the fracture 12 is dependent somewhat on the thickness of the material. If the casting is quite thick, the groove can be wider than one-half inch. On the other hand, if the wall of the casting in the area of the fracture is relatively thin, a groove may be less than one-half inch in width.

Figure 4:
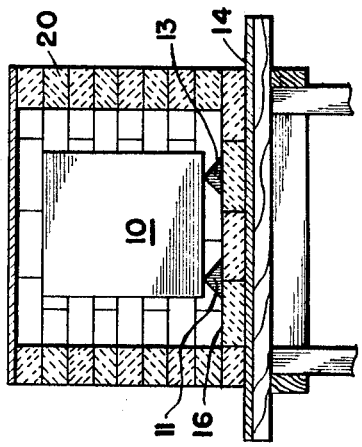
FIG. 4 is a vertical cross section illustrating the possition of the cast iron structure within the furnace during the cooling stage of the process of our invention.

The block structure is then welded using a neutral welding flame. The weld is accomplished by progressively depositing molten weld metal in the groove and fusing the walls of the grooves and the weld metal by the application of a neutral welding flame. In practice the weld should preferably start at the lowest point and progress upwardly allowing the impurities to float to the top of the molten pool of metal in the groove. The weld material of the welding rod should be approximately the same composition of the material of the block. The welding rod can in some instances include small amounts of other metals to form an alloy. For example, the rod can desirably be composed of one to two percent of molybdenum. The welding as done in the process of our invention is actually recasting. A puddle of molten metal is formed and additional metal from the rod is simultaneously added while stirring with the flame. Impurities are thereby kept free to float to the surface where they can be subsequently removed. For ease of welding, the casting is positioned so that the weld will be level, as illustrated in FIGURE 4. The molten metal will be less inclined to run away from the weld area and the molten metal can be stirred to make it clean and of better composition.

During the welding process step just described, the area of the weld in the head 10 will be raised to a temperature considerably higher than the rest of the block. The temperature in the immediate area of the weld will of necessity be raised to the melting point of the metal, which is normally in the range of 2200 to 3000 degrees F. After the welding has been completed, the area of the weld 22 is immediately cooled to below the critical temperature. The cooling of the area of the weld can be accomplished in any suitable way. However we have found that it is very convenient to use a stream of compressed air and flow it over the area of the weld. The area of the weld should be cooled to a temperature in the range of 900 to 1400 degrees F., more preferably in the range of 1000 to 1200 degrees F., and most preferably in the range of 1100 to 1150 degrees F. The area after it has been cooled will be cooled to a blue heat, and will be lowered to a temperature considerably below that of the remainder of the casting.

In the event that the head 10 contains other fractures that are to be repaired, the furnace can be quickly torn down and the head turned to expose the other areas to be repaired to a convenient working position. Care must again be used to support the cast iron head 10 in firm position to avoid warping. The furnace can then be assembled and the weld repair completed following the same sequence of method steps previously described.

After the area of the weld has been cooled down to well below the rest of the head, the furnace 20 is closed and the temperature allowed to equalize throughout the head 10. The heating torches can be removed or turned off at this point. We have found that by cooling the area of the weld to a temperature below the rest of the structure, while the remainder of the structure is at a relatively high temperature in which the material of the structure is relatively ductile or bendable, the stresses are completely removed.

The cast iron structure 10 is then allowed to slowly cool to a temperature below 400 degrees F. in the enclosed furnace as illustrated in FIG. 3 of the drawings. The rate of cooling should not exceed 400 degrees F. per hour, more preferably in the range of 100 to 200 degrees F. per hour. When the temperature of the cast iron structure 10 is in the range of 300 to 400 degrees, the furnace 20 can be disassembled, and the structure cleaned and refinished where necessary.

The welding process of our invention can be used to repair any repairable defect in a cast iron structure. For example the method can be used to weld fractures, build up burnt and worn valve seats, and the like.

The following example illustrates a preferred specific embodiment of the new welding process of our invention.

*Example I*

The cylinder head of a D-7 Caterpillar tractor engine which contained a fracture and an adjacent badly burned valve seat was repaired. The cylinder head was made of cast iron and weighed approximately 150 pounds. One side of the cylinder head had a relatively thin wall while the other wall was relatively thick. The cylinder head was placed on a table having a firebrick top and firmly supported thereon with the area to be welded placed in an upwardly facing inclined position. The cylinder head was then enclosed in a furnace constructed of firebrick. Two burners were used to pre-heat the head to a temperature to where the head just started to change to a red color. This change of color indicated a pre-heated temperature of approximately 1200 degrees F. During the pre-heating step the burners were arranged so that more heat was applied to the thicker side of the cylinder head. The pre-heating step took approximately 30 minutes. The fracture in the head was radially positioned relative to a valve seat and was approximately two inches in length. The fracture was located by heating with a torch and noting the darker dividing line produced by the insulating effect of the air gap. The material around the fracture was then washed out with a torch adjusted to a neutral flame. The fracture was then welded closed by progressively depositing weld metal into the groove and fusing the walls of the groove and weld by application of a neutral welding flame. A carbon plug was then inserted into the valve hole in order to form a mold for subsequent welding. Both the remainder of the fracture and valve seat area were then welded by progressively depositing welded metal in the groove and fusing the walls of the groove and weld by application of a neutral welding flame. The area around the weld was then cooled with a stream of compressed air until the color of the head changed to a blue heat. The furnace was then closed and the temperature in the head allowed to equalize. The entire casting was then cooled for four hours in the furnace with the burners removed. At the end of four hours the temperature of the casting was in the range of 300 to 400 degrees. F. The furnace was then torn down and the various machining operations necessary to put the block in serviceable condition were performed.

As will be obvious to those skilled in the art, various changes and modifications of the preferred welding method of our invention as described herein can be made or followed without departing from the spirit of the disclosure or the scope of the claims.

We claim:

1. A process of repairing a cracked cast iron engine block or the like comprising, (1) enclosing the block to be repaired in a firebrick furnace, (2) evenly pre-heating the entire block with heating torches to a cherry red heat indicating a temperature of approximately 1200 degrees F., (3) maintaining the temperature of the block at approximately the pre-heated temperature while, (4) enlarging, through an aperture in the furnace, the crack to be repaired to a groove approximately one-half inch wide by melting out the material of the block with a welding torch, (5) welding the block by progressively depositing molten cast iron weld metal in the groove and fusing the walls of the groove and weld metal by application of a neutral welding flame, (6) cooling the area of the weld with a stream of compressed air to a blue heat indicating a temperature of approximately 1100 degrees F. and well below the rest of the block, (7) completely closing the furnace to equalize the temperature throughout the block, and (8) slowly cooling the welded block to a temperature below 300 degrees F. at a cooling rate of approximately 150 degrees F. per hour.

2. A process of repairing a cracked cast iron structure comprising, (1) enclosing the structure to be repaired, (2) pre-heating the entire structure to a temperature in the range of 1150 to 1500 degrees F. within the enclosure, (3) continuing the application of heat to maintain the structure at approximately the pre-heated temperature while, (4) enlarging the crack to be repaired by melting out the material of the structure with a neutral flame, (5) welding the structure by progressively depositing molten cast iron weld metal in the resultant groove and fusing the walls of the groove and cast iron weld metal by application of a neutral flame, (6) cooling the area of the weld with a stream of gas to a temperature in the range of 1000 to 1200 degrees F., (7) equalizing the temperature throughout the structure, and (8) slowly cooling the welded structure to a temperature below 400 degrees F. at a cooling rate in the range of 100 to 200 degrees per hour.

3. A process of repairing a cast iron structure comprising, (1) enclosing the structure to be repaired, (2) evenly pre-heating the structure to a temperature in the range of 1100 to 1600 degrees F., (3) maintaining the temperature of the structure while, (4) melting away the cast iron of the structure in the area to be welded with a neutral flame, (5) welding the structure by progressively depositing molten weld metal and fusing the structure and cast iron weld metal by the application of a neutral flame, (6) rapidly cooling the area of the cast iron weld to a temperature in the range of 900 to 1400 degrees F., (7) equalizing the temperature of the structure, and (8) slowly cooling the structure to a temperature below 400 degrees F. at a cooling rate not in excess of 400 degrees F. per hour.

4. A process of welding cast iron structures comprising, (1) evenly pre-heating the structure to a temperature in the range of 1100 to 1600 degrees F., (2) maintaining the temperature of the structure at approximately the pre-heated temperature while, (3) removing material from the cast iron structure in the area to be welded to prepare same for welding, (4) welding the block by depositing molten cast iron metal in the area and fusing the walls of the structure and weld metal with a neutral flame, (5) rapidly cooling the area of the weld with a stream of gas to a temperature well below the rest of the structure but above 900 degrees F., (6) substantially equalizing the temperature throughout the block, and (7) slowly cooling the welded structure to a temperature below 400 degrees F. at a cooling rate not in excess of 400 degrees F. per hour.

5. A method of welding cast iron structures comprising, (1) enclosing the structure to be welded, (2) evenly pre-heating the structure to a temperature in the range of 1100 to 1600 degrees F., (3) removing portions of the structure in the area to be welded, (4) welding the structure by depositing molten cast iron weld material and fusing same to the structure, (5) rapidly cooling the resultant welded area to a temperature below the prevailing temperature of the structure but above 900 degrees F., and (6) slowly cooling the structure in a controlled environment.

6. A method of welding cast iron structures comprising (1) pre-heating the structure to a temperature in the range of 1100 to 1600 degrees F., (2) welding the structure using cast iron weld material where needed, (3) rapidly cooling the resultant welded area of the structure to a temperature below the temperature of the remaining portion of the structure but above 900 degrees F., and (4) slowly cooling the structure.

References Cited
UNITED STATES PATENTS

| | | | |
|---|---|---|---|
| 2,410,464 | 11/1946 | Scott | 29—402 |
| 2,632,944 | 3/1953 | Kittelson | 29—487 |

CHARLIE T. MOON, *Primary Examiner.*

D. C. REILEY, *Assistant Examiner.*